United States Patent
Giroux et al.

(10) Patent No.: US 6,370,116 B1
(45) Date of Patent: Apr. 9, 2002

(54) TOLERANT CIR MONITORING AND POLICING

(75) Inventors: Natalie Giroux, Ottawa; Andre Paquette, Kanata; Ali Rezaki, Ottawa; Bo Liu, Kanata, all of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/084,119

(22) Filed: May 26, 1998

(51) Int. Cl.[7] .............................................. H04L 12/54
(52) U.S. Cl. ....................... 370/232; 370/389; 370/230; 370/235
(58) Field of Search .................. 370/229, 230, 370/231, 232, 235, 252, 389, 391, 394, 465, 437, 253

(56) References Cited

U.S. PATENT DOCUMENTS

| | | | |
|---|---|---|---|
| 5,289,462 A | * | 2/1994 | Ahmadi et al. ............. 370/232 |
| 5,311,513 A | * | 5/1994 | Ahmadi et al. ............. 370/232 |
| 5,412,647 A | | 5/1995 | Giroux et al. |
| 5,625,622 A | | 4/1997 | Johri |
| 5,666,353 A | * | 9/1997 | Klausmeier et al. ........ 370/232 |
| 6,052,379 A | * | 4/2000 | Iverson et al. ............. 370/232 |
| 6,075,771 A | * | 6/2000 | Wolff et al. ................ 370/232 |

* cited by examiner

*Primary Examiner*—Wellington Chin
*Assistant Examiner*—Frank Duong
(74) *Attorney, Agent, or Firm*—Marks & Clerk

(57) ABSTRACT

A modification to the "leaky bucket" algorithm provides fair treatment of Frame Relay packets of varying length. The previously known leaky bucket scheme requires that there be sufficient credits in either the committed burst (Bc) bucket or excess burst (Be) bucket to accommodate the entire frame at an access point for the frame to be accepted. The "elastic leaky bucket" algorithm of the present invention permits acceptance of frames if there are any credits at all in the relevant buckets. This provides for fair treatment of long frames.

9 Claims, 4 Drawing Sheets

TOLERANT CIR MONITORING AND POLICING

FIELD OF THE INVENTION

This invention relates to fast packet switching for communications networks and more particularly to an improved rate enforcement strategy for packet rate control based on the "leaky bucket" algorithm.

BACKGROUND

Fast packet switching employing frame or cell relay (Frame Relay or Asynchronous Transfer Mode—ATM) technologies is used extensively in broadband communications networks. These switching techniques route packets of data through a mesh-type switching network in accordance with category and quality of service parameters agreed upon at call setup. Frame Relay (FR) is designed to handle bursty traffic patterns and Packet Transfer Exchange (PTX) systems such as the Newbridge 36120 provide dynamic bandwidth allocation on demand through its Rate Enforcement algorithms. FR products, generally, implement the ANSI and ITU-T standards for data traffic rate enforcement. By setting Committed Information Rate (CIR), committed burst (Bc) and excess burst (Be) values per Virtual Circuit (VC), the incoming traffic is regulated. CIR gives a guaranteed data rate whereas EIR (as calculated from CIR, Bc and Be) gives an excess burst information rate (over CIR) which will be allocated to a VC if there is enough bandwidth available (i.e. no congestion). The term Virtual Circuit (VC) as used herein is intended to include Permanent Virtual Circuits (PVC), Switched Virtual Circuits (SVC) and Soft Permanent Virtual Circuits (SPVC)

At VC establishment, the network operator agrees to provide Frame Relay service at CIR and EIR values. While CIR is a configurable parameter, other parameters (Bc and Be) have to be configured to meet a requested EIR value. Then, the rate enforcement algorithm is used to ensure that these limits are complied with by the user. This also ensures that Frame Relay service is provided fairly to all users.

The rate enforcement algorithm has come to be known as the "leaky bucket" algorithm. This name is applied to the algorithm in as much as its implementation can be compared to a bucket having a hole in the bottom. If a substance is poured into the top of the bucket it will drain from the hole in the bottom at a constant rate. The capacity of the bucket and the size of the drain hole dictates how much of the substance can be poured into the bucket before it overflows. In frame relay terms the substance may be equated to packets of information, the drain hole is the negotiated or committed information rate and the overflow relates to marked or discarded frames or packets.

At connection setup the committed information rate (CIR) in bits/sec, which is the rate the network commits to meet, is configured. The excess information rate (EIR) in bits/sec is the rate in excess of CIR that the network agrees to transfer information under normal conditions. All information classified as EIR is subject to discard and will be dropped or discarded in the event of network congestion. Thus, EIR frames are marked as being discard (or drop) eligible (DE).

In view of the two classes of information, i.e. CIR and EIR, the leaky bucket algorithm is frequently extended to a dual bucket analogy. In this analogy Bc and Be are considered as two buckets that are used to monitor that the traffic rate is within CIR and EIR respectively. According to one implementation of the dual leaky bucket algorithm if DE bits are not set in the incoming frames, Bc starts to fill up first and if there is no space left in Bc, the excess goes into Be and DE bits are set for frames flowing into Be. When Be fills too, the excess is discarded. The buckets are leaking at the rate of CIR and EIR respectively. That is, new space is opening in the buckets at allowed traffic rates so that new frames can make it into the buckets. The replenishing of the buckets are performed at the receipt of every frame. That is, before calculating to determine whether the new frame will fit in any of the buckets, the buckets are updated. The time difference between this frame and the previous update is calculated with a precision of a set time interval, 5 ms for example, and the allowed traffic amount within this interval is added to the buckets.

Thereafter the frame is tried to be placed in the buckets. This is actually the same as updating the bucket levels every 5 ms since bucket levels are not checked at any other time than the one at frame arrival. The standard recommends keeping this replenishing interval (5 ms in this case) as small as possible. This is to provide a precise calculation. In the present case, if two or more frames arrive in less than 5 ms, then it is necessary to make a decision without updating the bucket levels.

If DE bits are set in the incoming frames, they go directly into the Be bucket and if Be fills up, then excess frames are discarded.

Bucket size determines which sample of the traffic the algorithm will monitor. The bucket size can also be thought of as the length of a window on the incoming data sequence.

If the traffic pattern is varying rapidly, i.e. bursty traffic, then a larger window is needed to make a judgment on the data traffic values as an average value. Otherwise, i.e. with a small bucket size (or a small window), the switch will not be able to capture the correct data pattern. With a small window, the algorithm might observe the peak of a burst and discard too many frames since it would then assume that the high traffic rate is persistent but, if there is a large window it will observe that the traffic is varying and it will consider an average value in which case the peaks will be compensated for by the low traffic regions. The standard also indicates that measurement interval (T=Bc/CIR) should be proportional to the burstiness of the traffic which implies that the Bc bucket size should be proportional. CIR itself is not a parameter to change since it is the value being monitored. Thus a larger window will increase tolerance to variations in the traffic rate.

On the other hand, a large bucket size with bursty traffic might render the Rate Enforcement algorithm ineffective if the traffic rate falls too far below the CIR or EIR values or if there are completely idle periods after bursts of data at very high data rates such as the Access Rate (AR) and this repeats itself. The algorithm might end up letting through data at rates of multiples of CIR or EIR. This is due to the fact that by keeping the bucket size large an uncertainty is introduced to the process: rate enforcement takes effect only when the bucket is nearly full. That's when the frames are not let through or marked as DE. Until the bucket fills up, the algorithm has no way of knowing at what rate the traffic is flowing into the bucket. It is only known that it can come at most at the access rate (AR). In the extreme case, the traffic might come at the AR until the bucket fills and then stops until the bucket empties (leakage) and starts again. In this case frames are not discarded or marked DE, which doesn't necessarily mean that traffic rate is within CIR and/or EIR.

Technologies in this area have relied on the Committed Information Rate algorithms defined in ANSI specifications.

These algorithms essentially state that the user devices in a network can be policed to CIR, but are allowed to burst up to an excess burst. Excess burst traffic is marked as excess in frame relay by setting the discard eligible (DE) bit, (DE=1).

Most standards based CIR algorithms discard frames too frequently because if any part of an incoming frame causes the bucket to empty, the frame is tagged or discarded. This can cause a frame to be discarded even if it is over its committed burst (Bc) or its excessive burst (Be) by just one data bit. The end result is that frame relay customers may not get subscribed CIR because of the size of frames they are sending.

Other alternatives, such as a shared bucket strategy (i.e. shared Bc and Be buckets) discard the correct number of frames, but tag too often. Every frame that is not discarded because of bucket sharing is tagged. This results in frames being tagged at rates higher than CIR for incoming data at rates higher than CIR+EIR.

U.S. Pat. No. 5,412,647, which issued May 2, 1995 to Giroux et al, describes a frame relay rate enforcement algorithm based on the "leaky bucket" algorithm in which a portion of one "leaky bucket" is set aside for high priority frames only. U.S. Pat. No. 5,625,622 which issued Apr. 29, 1997 to Johri discusses a generalized "leaky bucket" method which allows for multiple burst sizes and drain rates.

There is, however, a requirement for a rate enforcement scheme which accommodates varying length packets or frames and in particular long frames.

SUMMARY OF THE INVENTION

The algorithm proposed in the present invention is a variation of the standards based CIR algorithm and tags frames as discard eligible at the correct rate regardless of the incoming data rate. The algorithm also has a tolerance for long frames that exceed the size of the Bc and Be buckets.

The improved algorithm according to the present invention requires that a frame be entirely in excess of the bucket to be tagged or discarded.

It is, therefore, an object of the present invention to provide an improved "leaky bucket" scheme which results in fair treatment of variable sized packets or frames of information and in particular long frames or packets. The improvement is achieved through a "leaky bucket" algorithm wherein frames or packets are allowed into designated buckets if any space remains in the buckets. This is in contrast to existing "leaky bucket" algorithms wherein there must be enough room in the buckets for the entire frame or packet for it to be accepted.

Therefore, in accordance with a first aspect of the present invention there is provided a method of enforcing information rate parameters in a packet switching network wherein a first information rate is assigned to information having a committed delivery status and a second information rate is assigned to information having a non-committed (best effort) delivery status, the network having rate limits for each status of information, the method comprising: examining a packet of information at an access point to the network and determining whether the packet is assigned to a committed or non-committed status; examining the rate limits for available capacity of each status of information and if the packet has committed status and if there is any available capacity within the committed status limit accept the packet, otherwise mark the packet as discard eligible; and examine available capacity of the non-committed status and if there is any capacity accept the marked packet, otherwise discard it.

In accordance with a second aspect there is provided in a packet switched communications network wherein data packets are introduced to access means at a switching node, a dual leaky bucket method of enforcing rate control on input data packets of variable length wherein the dual leaky buckets comprising an excess burst bucket for data packets having an information rate in excess of an agreed rate and a committed burst bucket for data packets having an information rate in compliance with an agreed rate, the method comprising; checking the packets for discard eligible marking; checking the committed burst bucket for available space and if any space remains accept packets without discard eligible marking else check excess burst bucket for space and if any space remains accept packets otherwise discard and if packets have discard eligible marking, check excess burst bucket for available space and if any exists accept marked packets otherwise discard.

In accordance with a further aspect of the invention there is provided a system for enforcing rate information parameters in a packet switching network for routing packets of information therethrough, the information having either a committed delivery class or a non-committed delivery class and wherein the network has defined rate limits for each class of information, the system comprising: means to dynamically determine the network status of each class of information and to determine whether there is any available capacity within the defined rate limits to accept additional packets; monitoring means at an access point to the network to determine to which class of information an arriving packet of information has been assigned; acceptance and marking means to accept a packet of committed class of information if any capacity remains, otherwise to mark the packet with discard eligible flags; acceptance and discard means to accept the marked packet if any capacity exists within the non-committed class rate limit, otherwise discard the marked packet.

BRIEF DESCRIPTION OF THE DRAWINGS

The invention will now be described in greater detail with reference to the attached drawings wherein.

DETAILED DESCRIPTION OF THE INVENTION

Figure 1:
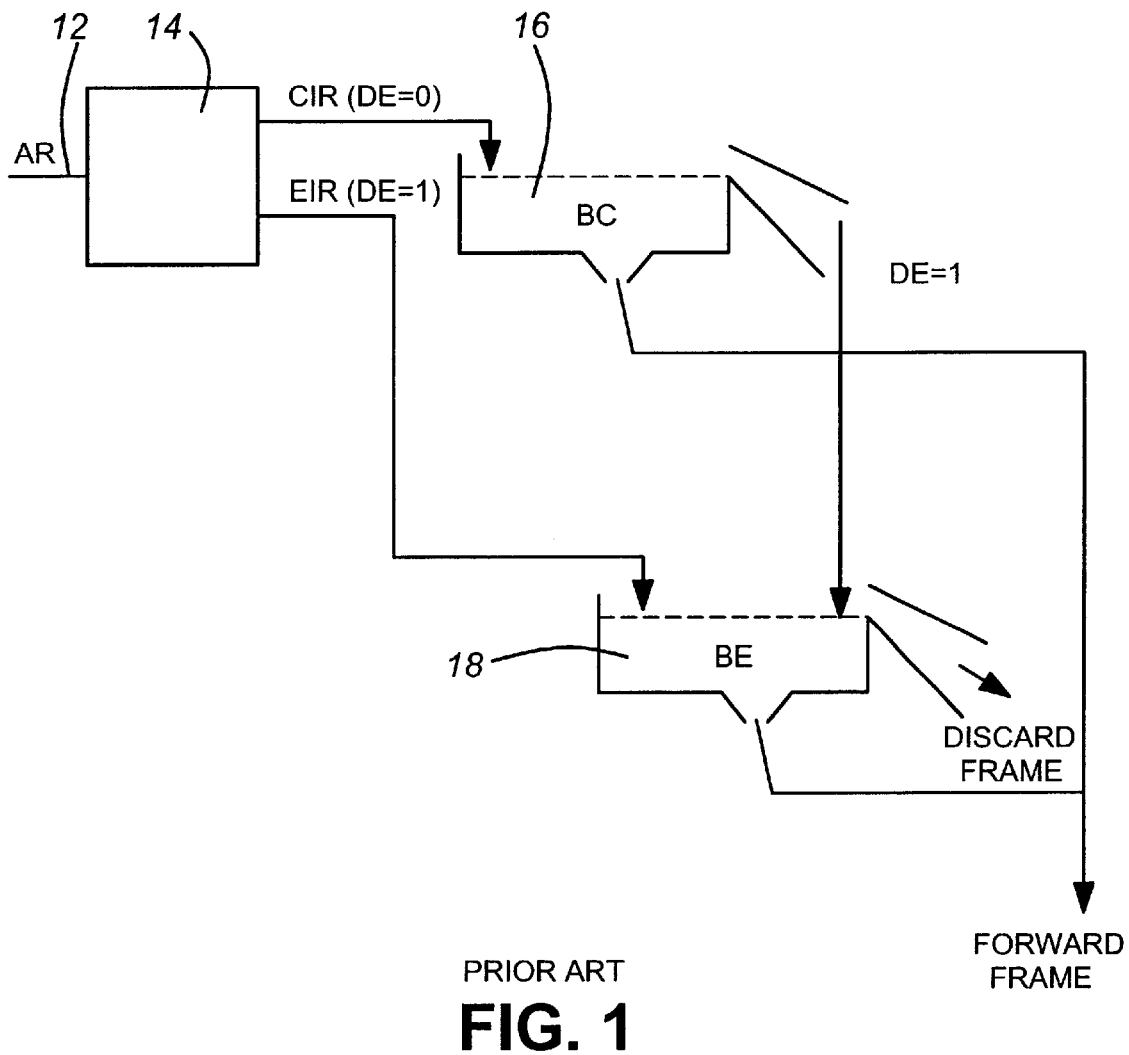
FIG. 1 illustrates the "leaky bucket" scheme according to the prior art.

The prior art "leaky bucket" scheme is illustrated graphically in FIG. 1. As shown, packets or frames 12 of information are supplied to an access point 14 of a network element. These packets will have been marked up-stream with a flag as to whether they are in compliance with a negotiated committed information rate (CIR) or whether they exceed the negotiated rate i.e. excess information rate (EIR). If the frames exceed the committed rate they will be discarded first in the event of network congestion. These frames are identified as discard eligible and the frame header is set with a discard eligible (DE) flag. At the access point the frames are checked for the DE flag and divided into two streams: CIR if flag is not set (DE=0) and EIR if it is (DE=1. The CIR stream flows into the committed burst (Bc) bucket 16 and the EIR stream flows into the excess burst (Be) bucket 18.

According to this algorithm, also know herein as the "inelastic leaky bucket", the Bc bucket is checked for available room for all of the frame or packet. If there is not sufficient room for the complete frame it is marked with the DE flag and sent to the Be bucket. Similarly frames directed to the Be bucket are checked against available space (bandwidth) in the bucket and if there is not enough to accept the complete frame it is discarded.

Figure 2:
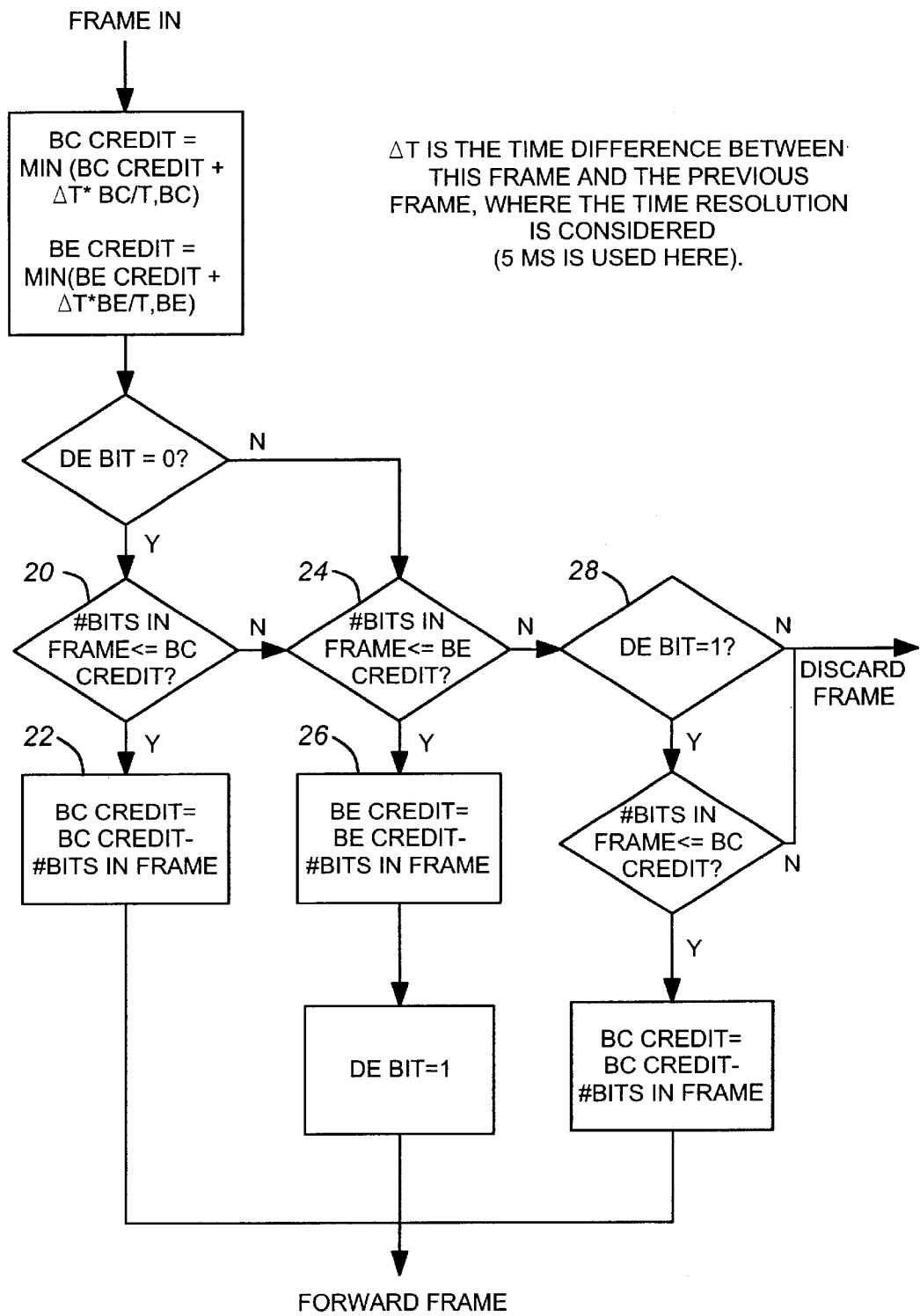
FIG. 2 is a flow diagram of the scheme of FIG. 1.

These process steps are set out in the flow diagram of FIG. 2. It will be apparent that this scheme treats long frames or packets unfairly particularly when the network is operating near its capacity. As expressed previously the network operating near its rate capacity will result in the buckets always being nearly full. Thus, when a long frame arrives it is less likely that there will be sufficient room in the bucket to accept the entire frame than for a short frame.

As shown in FIG. 2, when the inelastic algorithm is used for policing, the input frame (with DE bit clear) is first checked against the Bc credit (20). If there is enough space in the Bc bucket, the frame is accepted with the DE bit clear (22). If there is not enough space left in the Bc bucket, then the Be bucket is checked (24). If there is enough space in the Be bucket, the frame is accepted with the DE bit set (26). If there is no space in both the Bc bucket and the Be bucket, the frame is discarded or optionally, as shown at step (28) in FIG. 2 the status of the DE bit is again checked. In this optimal mode if the DE bit is set i.e. DE=1, step 20 is repeated and if there is enough space in the Bc bucket the frame. As accepted otherwise it is discarded.

Figure 3:
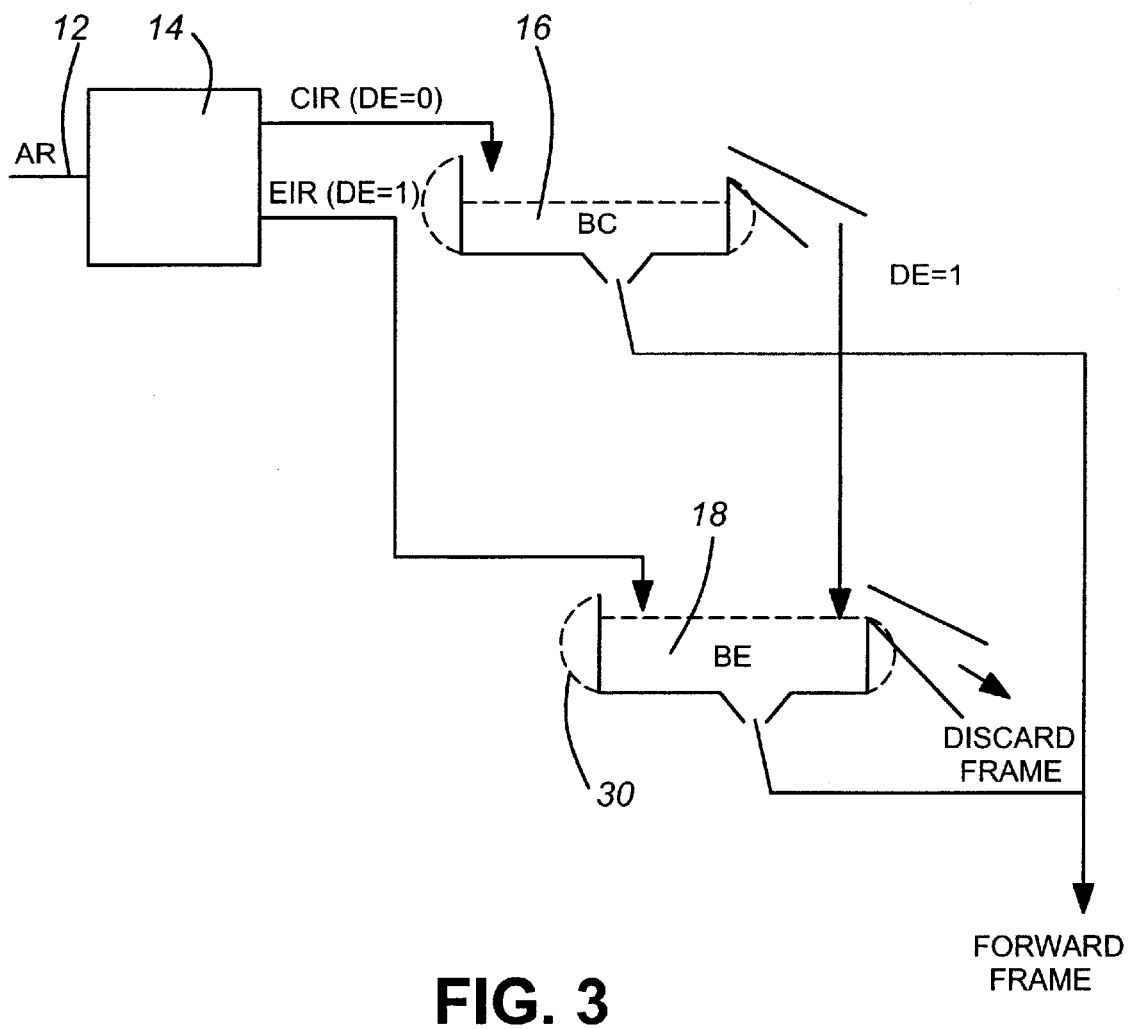
FIG. 3 illustrates the "elastic leaky bucket" algorithm of the present invention.

The present invention overcomes the aforementioned limitation by making the bucket, in effect, "elastic" with respect to its capacity. According to the "elastic leaky bucket" algorithm if there is any room at all in the bucket when a new frame arrives it will be accepted regardless of length. This is reflected in FIG. 3 wherein the buckets are shown to have "elastic" sides 30 such that the capacity can increase as required to accommodate a long frame.

Figure 4:
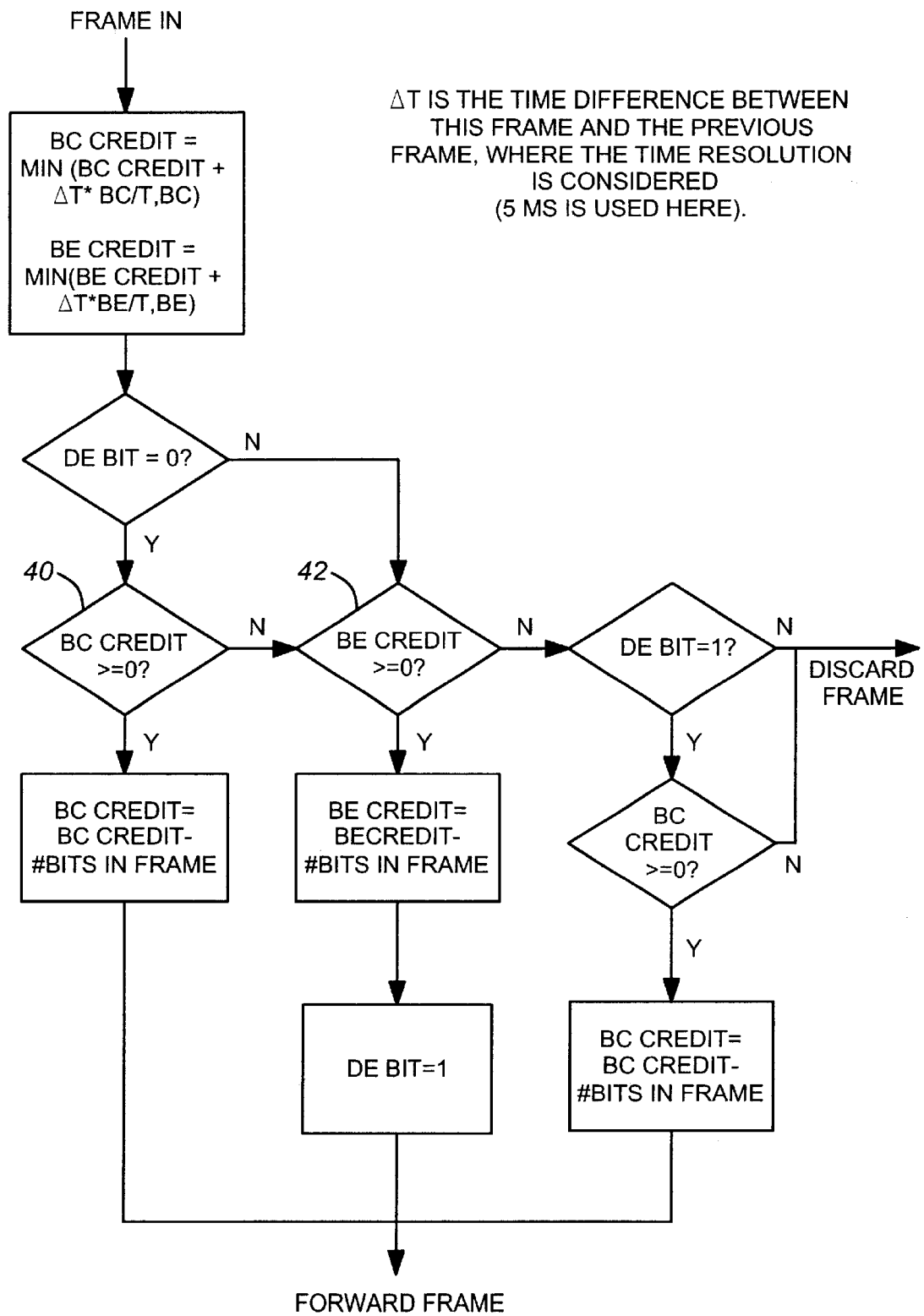
FIG. 4 is a flow diagram of the implementation steps of the algorithm of FIG. 3.

The difference between the "elastic" and "inelastic" algorithm, as illustrated in FIG. 4, is that when the elastic algorithm is used for policing, if there is any space left in the Bc bucket (40), the frame is accepted with DE bit clear. If there is any space left in the Be bucket (42), the frame which is checked against the Be credit is accepted with the DE bit set. As shown in FIG. 4 the frame is discarded if there isn't any space left in the Be bucket. As discussed in relation to FIG. 2 there is an optional step of again checking the state of the DE bit. If, as shown in this optional mode, DE=1 step 40 is repeated. If DE=0 the frame is discarded.

According to the invention the credits for both Bc and Be buckets are allowed to be negative in the "elastic" case. When the credits are negative, however, the buckets don't accept any more frames or packets until they "leak" into non-negative values.

Although a specific embodiment of the invention has been described and illustrated it will be apparent to one skilled in the art that numerous variations can be made to the basic concept. It is to be understood that such variations will fall within the scope of the invention as defined by the appended claims.

What is claimed is:

1. A method of enforcing rate parameters respecting variable length data packets at an access point in a packet switching network wherein a committed information rate (CIR) is assigned to data packets having a committed delivery status and an excess information rate (EIR) is assigned to data packets having a rate in excess of CIR, the network having configured rate limits for CIR and EIR, the method comprising: examining each data packet at said access point, and determining whether said data packet has been assigned a CIR or EIR delivery status; and accepting each data packet having a CIR delivery status if there is room within said CIR rate limit for at least a portion of said data packet, otherwise marking said packet discard eligible and determining whether there is room within said EIR rate limit for at least a portion of said data packet and if room exists accept said packet, otherwise discard.

2. A method as defined in claim 1 wherein if said packet is assigned EIR status and if there is capacity within said EIR limit for at least a portion of said packet accept said packet, otherwise discard.

3. A method as defined in claim 2 wherein said packet is a frame relay packet.

4. A method as defined in claim 3 wherein, if there is no room for at least a portion of said packet within either CIR or EIR rate limits check said data packet for discard eligible status and if said packet is not marked discard eligible discard said packet.

5. A method as defined in claim 4 wherein if said packet is marked discard eligible check for available space within CIR rate limit and if space exists for at least a portion of said packet accept said packet, otherwise discard.

6. A method as defined in claim 1 comprising an elastic, dual leaky bucket algorithm.

7. A system for enforcing rate information parameters in a packet switching network for routing variable length packets of information therethrough, said information having either a committed information rate (CIR) delivery class or an excess information rate (EIR) delivery class and wherein said network has defined rate limits for each class of information, said system comprising: means to dynamically determine the network status for each class of information and determine whether there is space within said defined rate limits to accept at least a portion of an incoming packet; monitoring means at an access point to said network to determine to which class of information an arriving packet of information has been assigned; means to accept a packet of committed class of information if space remains for at least a portion of said packet, otherwise mark said packet discard eligible means to accept said packet marked discard eligible if space exists for at least a portion of said packet within said excess rate information class rate limit, otherwise discard said packet marked discard eligible.

8. A system as defined in claim 7 wherein said means to dynamically determine the network status includes means to determine whether said packed is marked discard eligible.

9. In a packet switched communications network wherein variable length data packets are introduced to access means at a switching node, an elastic, dual leaky bucket method for enforcing rate control on said input data packets wherein elastic dual leaky buckets are employed, said leaky buckets comprising an excess burst bucket for data packets having an information rate in excess of an agreed rate, said packets being marked discard eligible (DE), and a committed burst bucket for data packets having an information rate in compliance with an agreed rate, said method comprising: checking said packets for discard eligible marking; checking said committed burst bucket for space for at least a portion of one of said packets and if space exists accept said one of said packets without discard eligible marking, if packets are marked DE check excess burst bucket for space for at least a portion of one of said packets and if space exists accept said one of said packets otherwise discard, and if said one of said packets has discard eligible marking, check excess burst bucket for space for at least a portion of one of said packets and if space exists accept said one of said packets marked DE otherwise discard.

* * * * *